US007668680B2

(12) United States Patent
Manfredi

(10) Patent No.: US 7,668,680 B2
(45) Date of Patent: Feb. 23, 2010

(54) OPERATIONAL QUALIFICATION BY INDEPENDENT REANALYSIS OF DATA REDUCTION PATCH

(75) Inventor: Charles Manfredi, Oakhurst, NJ (US)

(73) Assignee: Agilent Technologies, Inc., Santa Clara, CA (US)

( * ) Notice: Subject to any disclaimer, the term of this patent is extended or adjusted under 35 U.S.C. 154(b) by 328 days.

(21) Appl. No.: 11/713,394

(22) Filed: Mar. 2, 2007

(65) Prior Publication Data
US 2008/0215638 A1 Sep. 4, 2008

(51) Int. Cl.
*G01M 19/00* (2006.01)
(52) U.S. Cl. ........................................ 702/108; 702/117
(58) Field of Classification Search .................. 702/108
See application file for complete search history.

(56) References Cited

U.S. PATENT DOCUMENTS

| | | | |
|---|---|---|---|
| 6,456,955 B1 | | 9/2002 | Andrews et al. |
| 7,346,472 B1 | * | 3/2008 | Moskowitz et al. ......... 702/182 |
| 2004/0103216 A1 | * | 5/2004 | Lane .......................... 709/247 |
| 2004/0109453 A1 | | 6/2004 | Wirth |
| 2006/0041840 A1 | | 2/2006 | Blair et al. |
| 2006/0247878 A1 | | 11/2006 | Manfredi |

OTHER PUBLICATIONS

Agilent—Cerity Pharmaceutical For QA/QC. http://www.chem.agilent.com/Scripts/PDS.asp?IPage=272 pp. 2.
Waters Laboratory Informatics—Empower TM Chromatography Data Software. http://www.waters.com/watersdivision/contentd.asp?watersit=JDRS-5KXPGA pp. 2.
SSI—Chromatography Data System. http://www.scisw.com/products/cds/index2.htm pp. 2.
FormMax—E-Forms Software for Business Forms Designing and Filli . . . http://www.cutepdf.com/Products/FormsMax/ pp. 1-2.
AnIML—Analytical Information Markup Language. http://animl.sourceforge.net/ pp. 1-8.
Revision of ChemStations Plus—Agilent Technologies http://www.laboratorytalk.com/news/agi//agi134.html pp. 2.

* cited by examiner

*Primary Examiner*—Bryan Bui
*Assistant Examiner*—Jonathan Teixeira Moffat

(57) ABSTRACT

Methods systems and computer readable media for testing operation of an instrument controlled by a system under test. Raw data, used by the system under test to calculate reduced data, is inputted to an independent data reduction engine. Independent reduced data is calculated using at least one independent algorithm independent of a corresponding algorithm used by the system under test to calculate the reduced data. Values of the reduced data are compared with corresponding values of the independent reduced data, and at least one of outputting a result of the comparing for use by a human user, and storing a result of the comparing in memory are performed.

30 Claims, 4 Drawing Sheets

OPERATIONAL QUALIFICATION BY INDEPENDENT REANALYSIS OF DATA REDUCTION PATCH

BACKGROUND OF THE INVENTION

Qualification of instruments, and particularly operating software of such instruments has traditionally been performed by first determining that the features, menus and attributes specified in the software are present and available for selection, and secondly, that routines and algorithms provided by the software operate as expected. This secondary portion of the qualification is typically carried out by running a process or data reduction using the algorithms of the operating software (software under test) and comparing the final output to data previously processed by the same data system/software. In effect the algorithms are being used to verify themselves during this type of qualification. At best this can only show that the data system performs with some degree of precision, but says nothing of the accuracy of the algorithmic processes.

A potential problem with this type of qualification is that if the system used to produce the reference output is not functioning correctly, or the algorithms themselves, though working as designed, are faulty, then the functioning of the system under test (system/system operating software) can be qualified or approved, even though the results that it provides are inaccurate, since the qualification process will reproduce the same faulty or inaccurate results, and the comparison of results will show a substantial match which equates to qualification or passing. Accordingly, the typical qualification procedures do not provide an independent assessment of the correctness of the entire data reduction chain from the algorithmic accuracy through the final reporting of the data produced by the instrument/operating software.

In traditional qualification procedures, an instrument or system can be checked by running an algorithmic process on some data on a reference version of the system/software (typically in a controlled environment within the vendor's facility) to produced a result(s). The result(s) and the data are then shipped along with the actual systems/software to be qualified, wherein the system/software is qualified at the shipped-to site after installation and set up of the system. The theory according to this procedure is that if the result(s) produced by running the same algorithmic process on the same data with the newly installed system agrees with the result(s) produced by the reference system, then the installation is correct and the system can be deemed to be qualified, having passed this qualification procedure. A problem with this approach is that it is self justifying. That is, as long as there are no problems with the reference system and thus the result(s) produced thereby, then the newly installed system is properly qualified when it produces matching result(s). However, if there is some type of problem with the reference system (e.g., installation issues, system dependencies or fundamental algorithmic failures, etc), and the newly installed system shares the same type of problem, then both sets of results will match and the newly installed system will be qualified when it should not be, since both sets of results are erroneous in this case.

It would be desirable to provide qualification methods, systems and software that would provide independent qualification of an instrument/software to avoid self-justifying results and reduce the chances of erroneously qualifying a system when it should not be qualified (thereby eliminating or at least substantially reducing the number of false positive results).

SUMMARY OF THE INVENTION

The present invention provides, methods, systems and computer readable media for testing operation of an instrument controlled by a system under test.

In at least one embodiment, a method comprises the steps of: inputting raw data, used by the system under test to calculate reduced data, to an independent data reduction engine; calculating independent reduced data using at least one independent algorithm independent of a corresponding algorithm used by the system under test to calculate the reduced data; comparing values of the reduced data with corresponding values of the independent reduced data; and performing at least one of outputting a result of said comparing for use by a human user, and storing a result of said comparing in memory.

In at least one embodiment, at least one of the value comparisons is qualified as pass or fail, depending upon whether a difference between the reduced data value and the independent reduced data value of the value comparison is within a predetermined threshold range.

At least one embodiment further includes outputting an overall determination of whether the system under test passes qualification.

In at least one embodiment, the instrument is an analytical instrument.

In at least one embodiment, the reduced data comprises intermediate metadata subsequently used by the system under test to calculate final metadata.

In at least one embodiment, the reduced data comprises the intermediate data and the final metadata.

In at least one embodiment, the system under test comprises a computerized data system.

In at least one embodiment, the calculation of independent reduced data comprises one or more calculations performed according to instructions instantiated as forms.

In at least one embodiment, the system under test produces further reduced data or metadata from the reduced data, and the method further comprises: calculating independent further reduced data or metadata from the independent reduced data using at least one independent algorithm independent of a corresponding algorithm used by the system under test to calculate the further reduced data or metadata; comparing values of the further reduced data or metadata with corresponding values of the independent further reduced data or metadata; and performing at least one of outputting a result of the comparing for use by a human user, and storing a result of the comparing in memory or returned to an output form.

In at least one embodiment, the system under test produces reported data from at least the reduced data, and the method further comprises: calculating independent reported data from at least the independent reduced data; comparing values of the reported data with corresponding values of the independent reported data; and performing at least one of outputting a result of the comparing for use by a human user, and storing a result of the comparing in memory.

In at least one embodiment, the system under test produces reported data from the reduced data and the further reduced data or metadata, and the method further comprises: calculating independent reported data from the independent reduced data and the independent further reduced data or metadata; comparing values of the reported data with corresponding values of the independent reported data; and performing at least one of outputting a result of the comparing for use by a human user, and storing a result of the comparing in memory.

In at least one embodiment, a final evaluation of the system is performed for acceptance to generate a final acceptance or failure result from further procession of results of the comparisons.

A method comprising forwarding a result of a method described herein is provided.

A method comprising transmitting data representing a result obtained from a method describe herein is provided.

A method comprising receiving a result obtained from a method described herein, from a remote location, is provided.

A system for testing operation of an instrument controlled by a system under test, is provided, including: a data reduction engine operating independently of the system under test, the data reduction being configured to receive raw data used by the system under test to calculate reduced data; and at least one independent algorithm provided with the data reduction engine that is independent of a corresponding algorithm used by the system under test to calculate the reduced data.

In at least one embodiment, a system further includes a comparator engine; the comparator engine configured to receive the reduced data calculated by the system under test and independent reduced data calculated by the data reduction engine, and to compare corresponding data values of the reduced data and the independent reduced data.

In at least one embodiment, the comparator engine is further configured to qualify at least one of the value comparisons as pass or fail, depending upon whether a difference between the reduced data value and the independent reduced data value of the value comparison is within a predetermined threshold range.

In at least one embodiment, the system is configured with at least one settable threshold range that is settable by a human user.

In at least one embodiment, a calculation engine is configured to provide an overall determination of whether the system under test passes qualification.

In at least one embodiment, the instrument is an analytical instrument.

In at least one embodiment, the reduced data comprises intermediate metadata subsequently used by the system under test to calculate further reduced data or metadata.

In at least one embodiment, the further reduced data is used to produce reported data.

In at least one embodiment, the system under test comprises a computerized data system.

In at least one embodiment, the system includes a reporting engine configured to receive at least one of independent reduced data and independent further reduced data or metadata and output reported data.

In at least one embodiment, at least one form is included, wherein the data reduction engine calculates the independent reduced data according to instructions instantiated as forms.

In at least one embodiment, at least one form is included, wherein the comparator engine compares the corresponding data values according to instructions instantiated as forms.

In at least one embodiment, at least one form is included, wherein the comparator engine qualifies the comparisons according to instructions instantiated as forms.

In at least one embodiment, at least one form is included, wherein the reporting engine generates and outputs an output report according to instructions instantiated as forms.

A computer readable medium carrying one or more sequences of instructions for testing operation of an instrument controlled by a system under test is provided, wherein execution of one or more sequences of instructions by one or more processors causes the one or more processors to perform the steps of: inputting raw data, used by the system under test to calculate reduced data, to an independent data reduction engine; calculating independent reduced data using at least one independent algorithm independent of a corresponding algorithm used by the system under test to calculate the reduced data; comparing values of the reduced data with corresponding values of the independent reduced data; and performing at least one of outputting a result of the comparing for use by a human user, and storing a result of the comparing in memory.

These and other advantages and features of the invention will become apparent to those persons skilled in the art upon reading the details of the methods, systems and computer readable media as more fully described below.

DETAILED DESCRIPTION OF THE INVENTION

Figure 1:
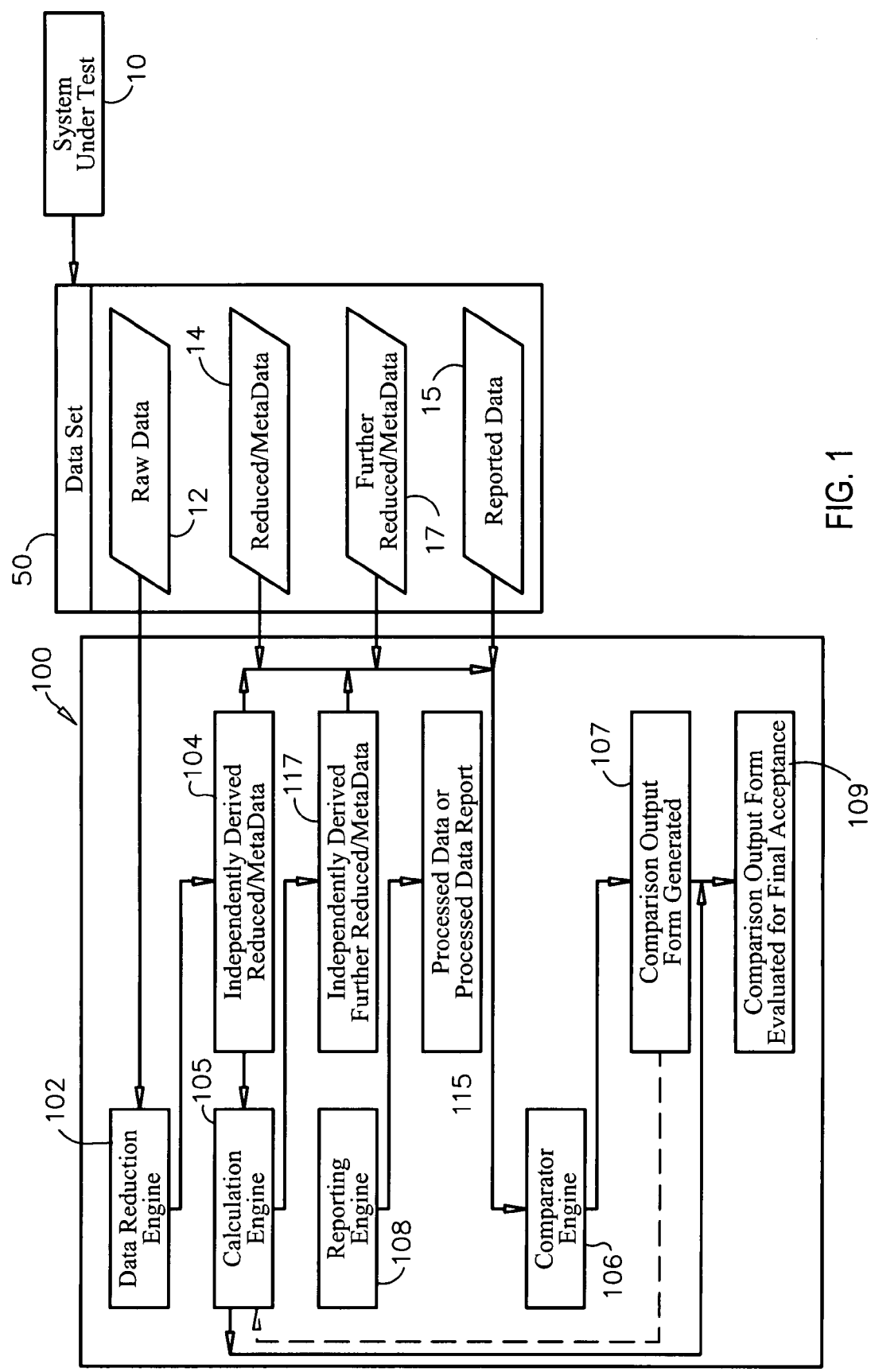
FIG. 1 is a block diagram illustrating use of a system 100 for operational qualification procedures for operational qualification of a system under test.

Before the present systems, methods and computer readable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a result" includes a plurality of such results and reference to "the algorithm" includes reference to one or more algorithms and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

A "database" refers to a collection of data arranged for ease and speed of search and retrieval. This term refers to an electronic database system (such as an Oracle database, for example, although not limited to this) that would typically be described in computer science literature.

An "independent algorithm" or "independent process" refers to an algorithm or process of independent source, i.e., where the algorithm or process is designed and programmed independently of another algorithm or process that it is described as being independent of. Thus, for example an independent algorithm may be a completely different algorithm from the algorithm that it is being compared to, or may have some or all of the same algorithmic steps or even be the same algorithm. However, since the independent algorithm is of independent source relative to the source of the other algorithm (algorithm that it is being described as independent of), then it is independent and it is unlikely that the programmers of the independent algorithm and the programmer of the other algorithm would program the same error(s) into their respective algorithms. Likewise, an independent process is one that is created independently of a process that was used by a system under test to produce a given result or intermediate result. The independent process may require the same, fewer, or greater number of steps or algorithms to provide the result, but it is designed independently to provide the same result that the process of the system under test is providing.

When one item is indicated as being "remote" from another, this is referenced that the two items are at least in different labs, offices or buildings, and may be at least one mile, ten miles, or at least one hundred miles apart.

"Communicating" information references transmitting the data representing that information as electrical signals over a suitable communication channel (for example, a private or public network).

"Forwarding" an item refers to any means of getting that item from one location to the next, whether by physically transporting that item or otherwise (where that is possible) and includes, at least in the case of data, physically transporting a medium carrying the data or communicating the data.

A "processor" references any hardware and/or software combination which will perform the functions required of it. For example, any processor herein may be a programmable digital microprocessor such as available in the form of a mainframe, server, or personal computer (desktop or portable). Where the processor is programmable, suitable programming can be communicated from a remote location to the processor, or previously saved in a computer program product (such as a portable or fixed computer readable storage medium, whether magnetic, optical or solid state device based). For example, a magnetic or optical disk may carry the programming, and can be read by a suitable disk reader communicating with each processor at its corresponding station.

"May" means optionally.

Methods recited herein may be carried out in any order of the recited events which is logically possible, as well as the recited order of events.

Methods, Systems and Computer Readable Media

Disclosed herein are methods, systems and computer readable media for operational qualification of instruments. In particular, operational qualification of analytical instruments the are processed controlled by operational software is provided, although the present invention is not limited to analytical instruments, but can be used to operationally qualify operational software of any instrument that processes data to produce one or more results. The software (at least one independent algorithm or process) and hardware used in performing the qualification methods are independent of the instrument/software (system under test) and can thus perform data reduction and calculations on reduced data. These independently produced data reduction and results of calculations on reduced data (e.g., further reduced data/metadata and/or reported data) can then be compared with data reduction and results of calculations on reduced data produced by the system under test running its process(es) on the same input data to make a determination as to whether the system under test passes the operational qualification procedure, as well as to make comparisons of individually reported data items belonging to any, up to all of the reduced data (reduced/metadata), and results of calculations on reduced data.

Thus, evaluation (e.g. operational qualification testing) does not rely on the subsystems of the system under test for operational qualification of the system under test, but rather independent evaluation and confirmation (qualification) are performed, thereby avoiding instances of self-justifying qualification where a system should not be qualified, but due to similar errors produced by a qualification method, the qualification result is a pass. For example, the present invention may use one computerized data system to perform data reduction to provide reduced data that can be compared to reduced data outputted by another computerized data system in order to verify or validate the processing of that other computerized data system used to output the reduced data.

Subjective evaluations carried out by prior art practices can be eliminated by automated comparison of native processing of the system under test versus reference processing by the present invention.

Further, the output from an evaluation or qualification process described herein can be provided in a format that can be routed to automated evaluation processors for final qualitative assessment.

Figure 2:
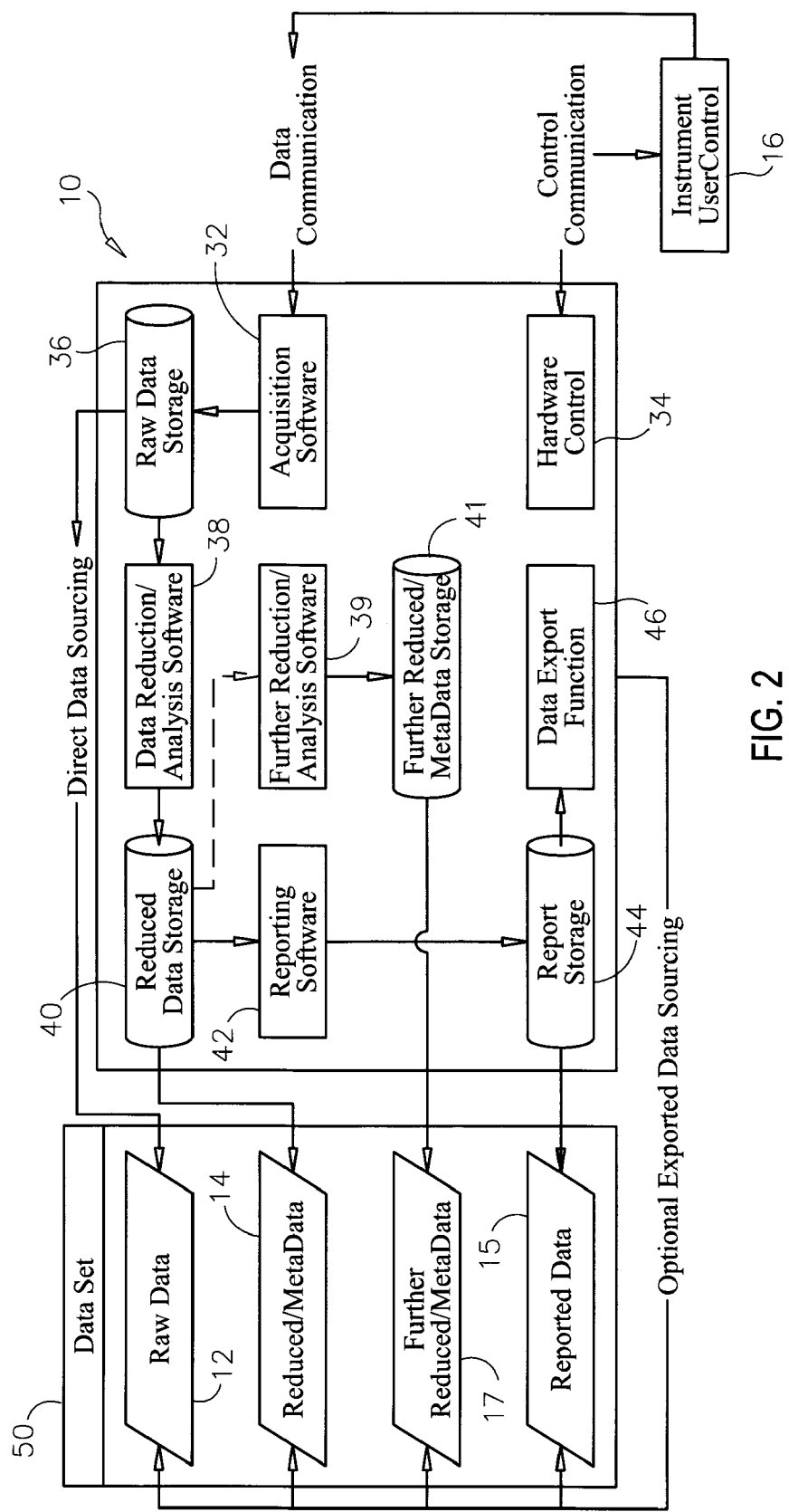
FIG. 2 is a block diagram illustrating an exemplary system under test and data set produced thereby.

Referring now to FIG. 1, a block diagram illustrating use of a system 100 for operational qualification procedures for operational qualification of a system under test (SUT) 10 is shown. The system under test 10 is typically a computerized data system that controls an instrument, such as an analytical instrument (e.g., chromatograph, mass spectrometer, scanner, or other analytical instrument), or any other instrument that the system under test 10 controls, via software to operate the instrument and get output from the instrument. FIG. 2 schematically illustrates an example of a system under test (alternatively referred to as "data system under test") 10, indicating examples of software modules and hardware that may be included in such a system 10. System under test 10 includes at least one processor configured to process and execute programs of the software modules, and may include storage devices as noted, as well as other hardware configured to export data as well as connect to additional hardware that receives data by direct data sourcing.

System under test 10 may include an acquisition software module 32 in communication with one or more instrument(s) under control 16 to receive data therefrom resultant from operation of the instrument(s) under control 16, and a hardware control module 34 in communication with instrument(s)

under control 16 to provide control communications that control the operation of instrument(s) under control 16. Upon acquisition of data from instrument(s) under control 16, acquisition software module 32 may store the acquired data as "raw data" 12 directly to a raw data storage device 36. This raw data may be obtained for use in a data set 50 for use by the present invention by direct data sourcing form raw data storage device 36. System under test 10 further includes data reduction/analysis software module 38 that receives raw data 12 from raw data storage device 36 and processes the data to output reduced data or metadata 14. This reduced data/metadata 14 may be stored directly to reduced data storage device 40. This reduced/metadata 14 may be obtained for use in a data set 50 for use by the present invention by direct data sourcing from reduced data storage device 40.

Optionally, further reduction of the reduced data/reduced metadata 14 maybe processed or calculated by Further Reduction/Analysis software 39. As one non-limiting example, reduced/meta data 14 may include one or more tables of data resulting from an analog to digital conversion of the raw data, that is an analog signal produced by the instrument under control 16. Further reduced/metadata 17 from this example may then include statistics calculated on this data. For example, if the reduced/metadata 14 includes a table of start and stop times, as well as apex values of peaks from the digital conversion of the analog signal in the raw data 12, then further reduced/metadata 17 may be calculated as areas under the peaks (integration), statistics performed on the peaks, such as mean, median value, standard deviation, signal to noise, etc.

A reporting software module 42 may be provided to receive reduced/metadata 14 from reduced data storage device 40 and/or further reduced/metadata storage device 41 and further process the reduced/metadata (and, optionally, further reduced/metadata) to extract data and/or calculate data values from the reduced/metadata 14 (and optionally, further reduced/metadata 17) and provide this further processed data as reported data 15 that is used to generate a report for viewing and use by a human user. Reported data 15 may be stored directly to report data storage device 44. This reported data 15 may be obtained for use in data set 50 for use by the present invention by direct data sourcing from report storage device 44.

It is noted here that the diagram of FIG. 2 is only exemplary and may be modified to achieve the same results. For example two or more of the data storage devices may be combined to perform combined storage functions of the particular types of data that they are described above to store. Likewise, two or more software modules may be combined to perform the combined functions described above. In practice, the designer of the present invention may not know the architecture or structure of the system under test 10, and need not know this, since only the results that are to be compared need be known, so that the designers can design independent algorithm(s)/process(es) designed to achieve the same results based on inputting the same raw data.

System under test may include a data export function module 46 configured to receive raw data 12, reduced/metadata 14 and reported data 15 and export these data to data set 50 as an alternative method of populating data set 50 for use by the present invention.

The controlling functions of the system under test (e.g., control communications and functions of hardware control module 34) are not the subject of the qualification procedures, but rather the data reduction functions of the system under test are subject to the qualification procedures (e.g., data reduction analysis and reporting functions). The system under test 10 controls one or more instruments to obtain raw data 12 that is inputted to the system under test 10 for further processing. The raw data is collected by the instrument or instruments being controlled by the system under test 10 and this raw data is inputted to the system under test 10. The data reduction/analysis module 38 processes the raw data, including data reduction processing to output reduced data (alternately referred to as reduced/metadata) 14, as noted above. The reduced data 14 may include meta data such as calculations performed on data values of the raw data (e.g., signal strength, peak signal values, noise, signal-to-noise values, etc.). The reduced data may be data that is used as a final output for use by a human user (such as by a printout, display on a user interface/computer display screen, or saved to a computer file) or can be intermediate reduced data that is used for further processing by the system under test 10 to calculate further reduced data or metadata 17 and/or final results, such as reported data 15. Further alternatively, all of these data (i.e., reduced/metadata 14, further reduced data/metadata 17 and final reduced data, e.g., reported data 15) can be analyzed in operational qualification procedures. Further reduced data/metadata 17 includes data resulting from further reduction of reduced/metadata 14 by performing calculations on the reduced/metadata 14. Examples of further reduced data/metadata 17 include, but are not limited to, statistics calculated on the reduced data, integration results calculated from the reduced data, etc.

Data set 50 (which may include raw data 12, reduced/metadata 14 optionally, further reduced/metadata 17, and, optionally, reported data 15) are inputted to the operational qualification system 100 (FIG. 1), with the raw data being inputted to a data reduction engine 102. The raw data 12 is the same raw data that was processed by the system under test 10 and is independently reduced by data reduction engine 102 to provide independently derived reduced/metadata 104 having values corresponding to the values in the reduced/metadata 14 calculated by the system under test 10. To produce the independently derived reduced/metadata 104, reduction engine 102 uses one or more independent algorithms and/or processes that are independent of the algorithms and/or processes used by the system under test 10/data reduction/analysis software 38 to reduce the data. Accordingly, two different, independent systems 10/38, 100/102 use independent algorithm(s)/process(es) to process the same raw data 12 in an attempt to reproduce the same reduced/metadata as a result.

Figure 3:
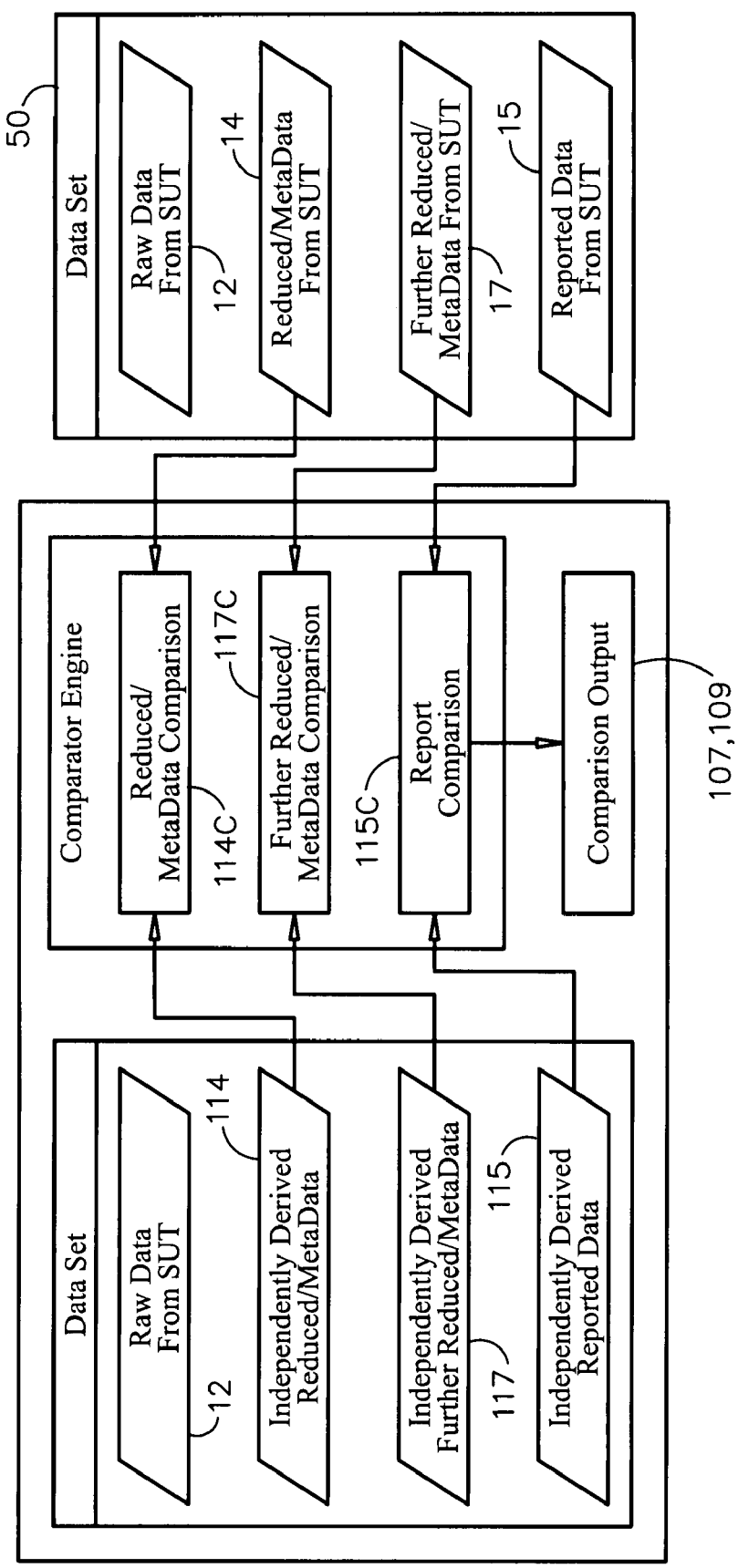
FIG. 3 is a block diagram illustrating comparisons of data from a system under test with independently derived data.

Independently derived reduced/metadata 104 is compared (FIG. 3, 114c) with reduced/metadata 14 by comparator engine 106 which compares the corresponding data values in the compared data to determine difference values between the corresponding data values as comparison results. The comparison results from comparator engine 106 can be populated into a comparison output form 107 which can be directly outputted to a computer display, paper printout, storage, or other device where it can be accessed and used by a human user. Alternatively or additionally, these comparison values in the comparison output form can be integrated into a comparison output form evaluated for final acceptance 109, described in greater detail below.

It is noted however, that alternatively, reduced data 14 and reduced data 104 can be outputted, e.g., displayed on a computer display, printed out, or outputted in some other format for review by a human user and the human user can manually compare the data values in reduced data 14 with the corresponding values in reduced data 104. In this case, the user can rely upon predetermined threshold values to determine whether the corresponding values are within passable ranges, and make a determination as to whether the system under test 10 passes qualification based on this information. Alternatively, the user may compare one or more data values 14 with the corresponding data values 104 and make a subjective determination as to whether the values are close enough to matching to merit passing the operational qualification test.

Calculation engine 105 may be employed to calculate independently derived further reduced/metadata 117 when further reduced/metadata 17 is to be tested, wherein the further reduced/metadata 117 values are which are values outputted to correspond to further reduced/metadata values 17, and which should be equal thereto, or within limits, to qualify the system under test as passing regarding this portion of the functions of the system under test 10.

To produce the independently derived further reduced/metadata 117, calculation engine 105 uses one or more independent algorithms and/or processes that are independent of the algorithms and/or processes used by system under test 10/further reduction/analysis software 39 to further reduce the reduced data/metadata 14, and uses these to further reduce the reduced data/metadata 104. Accordingly, two different, independent systems 10/39, and 100/105 use independent algorithm(s)/process(es) to process the respective reduced data sets 14/104 in an attempt to reproduce the same further reduced/metadata (comparison of 17 and 117 within passing limits) as a result.

Independently derived further reduced/metadata 117 is compared (FIG. 3, 117c) with further reduced/metadata 17 by comparator engine 106 which compares the corresponding data values in the compared data to determine difference values between the corresponding reduced/metadata values 17,117 as comparison results. The comparison results from comparator engine 106 can be populated into comparison output form 107 which can be directly outputted to a computer display, paper printout, storage, or other device, with or without comparison results of the reduced metadata values 14,104 where it can be accessed and used by a human user. Alternatively or additionally, these comparison values in the comparison output form can be integrated into a comparison output form evaluated for final acceptance 109, described in greater detail below.

It is noted however, that alternatively, further reduced/metadata 17 and independently derived further reduced/meta data 117 can be outputted, e.g., displayed on a computer display, printed out, or outputted in some other format for review by a human user and the human user can manually compare data values in further reduced/meta data 17 with the corresponding values in further reduced/meta data 117. In this case, the user can rely upon predetermined threshold values to determine whether the corresponding values are within passable ranges, and make a determination as to whether the system under test 10 passes qualification based on this information. Alternatively, the user may compare one or more data values 17 with the corresponding data values 117 and make a subjective determination as to whether the values are close enough to matching to merit passing the operational qualification test.

The independently derived further reduced/metadata 117, if calculated, and the independently derived reduced/metadata 104 are inputted to a reporting engine 108. Reporting engine 108 processes the inputted data to output independently derived reported data 115 that corresponds to the reported data generated by system under test 1 0/reporting software 42. The reported data 115 is independently derived using one or more independent algorithms and/or processes that act on the independently derived reduced/metadata 104 and, optionally, independently derived further reduced/metadata 117. This independently derived reported data can be populated to a processed data report 118, for example in a format facilitating comparison with the reported data 15. Alternatively, reported data 115 can be a data file. In either case, reported data 115 and reported data 15 are inputted to comparator engine 106 for comparison (FIG. 3, 115c) of the corresponding values.

The comparison results from comparator engine 106 can be populated into comparison output form 107 which can be directly outputted to a computer display, paper printout, storage, or other device, with or without comparison results of the reduced metadata values 14,104 where it can be accessed and used by a human user. Alternatively or additionally, these comparison values in the comparison output form can be integrated into a comparison output form evaluated for final acceptance 109, described in greater detail below.

Further alternatively, reported data 15 and independently derived reported data can be outputted, e.g., displayed on a computer display, printed out, or outputted in some other format for review by a human user and the human user can manually compare the data values in reported data 15 with the corresponding values in reported data 115. In this case, the user can rely upon predetermined threshold values to determine whether the corresponding values are within passable ranges, and make a determination as to whether the system under test 10 passes qualification based on this information. Alternatively, the user may compare one or more data values 15 with the corresponding data values 115 and make a subjective determination as to whether the values are close enough to matching to merit passing the operational qualification test.

The data values in comparison output form 107 can be inputted to calculation engine 105 for further evaluation of the system under test 10, and ultimately an overall evaluation result for final acceptance. For example, calculation engine can make "intra-run" evaluations, as well as "inter-run" evaluations. That is, for intra-run evaluations, evaluations are made based on a single run of the instrument 16, where, for example only a single data set 50 has been evaluated by system 100. There may be multiple tests that are evaluated, e.g. a test for signal-to-noise ratio, a test for peak retention times, etc. For each individual test, comparator engine 106 may includes in the comparison output whether the comparison is within limits (pass), out of limits (fail) or not performed (NA). Calculation engine 105 may then apply rules that determine whether the system 10 receives an overall pass or fail result, based on the results of the individual tests. The individual test results may be weighted and/or other rules may be applied (e.g., "test #4 must pass or the overall system test fails").

Inter-run evaluations may also be performed by calculation engine, where multiple data sets 50 have been independently evaluated by system 100. As with intra-run evaluation, there may be multiple tests that are evaluated for each respective data set 50, which may be individually evaluated by comparator engine 106. Calculation engine 105 may then compare these test results and/or difference values from the individual tests across data sets 50 to provide evaluation of accuracy or repeatability of results by the system. As with intra-run analysis, calculation engine 105 may apply rules that determine whether the system 10 receives an overall pass or fail result, based on the results of the inter-run comparisons of individual test results. These rules may apply weightings to particular comparisons or other specific rules for determining an overall evaluation.

Using the further evaluations outputted from calculation engine in combination with the information in the comparison output form 107, an output form evaluated for final acceptance 109 can be generated and outputted for use by a human user, to notify the user whether or not the system under test has passed the evaluation.

System 100 may be incorporated into a compliance system, such as a compliance system described in co-pending, commonly owned application Ser. No. 11/119,255, filed Apr. 29, 2005 and titled "Integrated Tool for Compliance Testing Within an Enterprise Content Management System". application Ser. No. 11/119,255 is hereby incorporated herein, in its entirety, by reference thereto.

In a particular embodiment, the system under test 10 is a computerized data system used to control an analytical instrument 16, which, in this particular example is a gas chromatograph. It is noted that the incorporation of the present system into a compliance system is not limited to operational qualification testing of gas chromatographs, or even to analytical instruments 16 as noted, but can be applied to any system under test 10 that controls any instrument, via software to operate the instrument and get output from the instrument.

As one example, a user may wish to operationally qualify the signal-to-noise ratio data calculated by the system under test 10. For example, the system under test 10 controls the instrument (in this case, chromatograph) 16 to sample a standard (chemical used for standardization/calibration purposes). Instrument 16 produces a chromatogram in response, which is inputted as raw data 12 to the system under test 10. The system under test 10 runs an algorithmic process on the data, on a data reduction engine/software 38, to digitize the analog signal input and identify start and stop times of the peaks, as well as apex values of the peaks. Further, the chromatograph can be integrated to identify the peaks. Further reduced/metadata may be calculated, such as noise calculated as a function of instantaneous changes in the chromatograph plot and/or by standard, well-known calculations. Additionally, other further reduced data values may be calculated, including, but not limited to retention time. Further, the peak area value of each peak is divided by the calculated noise value to give a signal-to-noise ratio value.

The raw data 12 is inputted to data reduction engine 102. The system 100 as part of a compliance system provides forms, as described in application Ser. No. 11/119,255, that can be used to set up the parameters for algorithmic processing by data reduction engine 102, as well as to set threshold values for use by comparator engine 106 and calculation engine 105, for example. Data reduction engine 102 independently processes the raw data 12 to independently calculate values 104 for the same metadata variables that reduced data values 14 were calculated for, and calculation engine 105 processes the independently derived reduced/metadata 104 to produce independently derived, further reduced/metadata 117. Thus, peak signal data values, noise, signal-to-noise, and the other values mentioned above are calculated by independent algorithm(s) and/or process(es) relative to those used by the system under test 10. Optionally, raw data 12 may be converted to a technology neutral format prior to processing by data reduction engine 12.

Comparisons of corresponding values of reduced/metadata 14—independently reduced/metadata 104; further reduced/metadata 17—independently reduced/metadata 117 and reported data 15—independently derived reported data 15 are made by comparator engine 106 as described previously. Comparisons of corresponding data values are performed, with reference to threshold values, if provided, wherein the comparator engine 106 can make line by line determinations as to whether the data comparisons are within tolerance (threshold) limits and pass, or are not, and fail. Additionally, or alternatively, an algorithm may be provided that determines whether, overall, the metadata calculated by the system under test passes the operational qualification test, and such algorithm may include different weightings for different individual data values, or may be otherwise tailored depending upon the types of data being compared, customer specifications, etc. As noted above, this algorithm can be run by calculation engine 105. As another alternative, in this example, the pass or fail determination could optionally be made based upon the comparison of signal-to-noise value comparisons alone. Further alternatively, an overall pass determination could require the peak signal value comparisons to be within tolerance, the noise value comparisons to be within tolerance and the signal-to-noise value comparisons to be within tolerance.

The output from reporting engine 108 may include line-by-line comparisons of all of the intermediate metadata values 104, 14 (e.g., peak signal values, integrated peak areas, peak response values, noise, retention time values, etc.), with or without pass-fail determinations for these, or the output may report only comparison of the final metadata output(s) (in this case, signal-to-noise ratio value comparisons) with a determination as to pass or fail. The format and content of the output report 107 may also be set up and selected by a human user through the use of the interactive forms provided by the compliance system.

Figure 4:
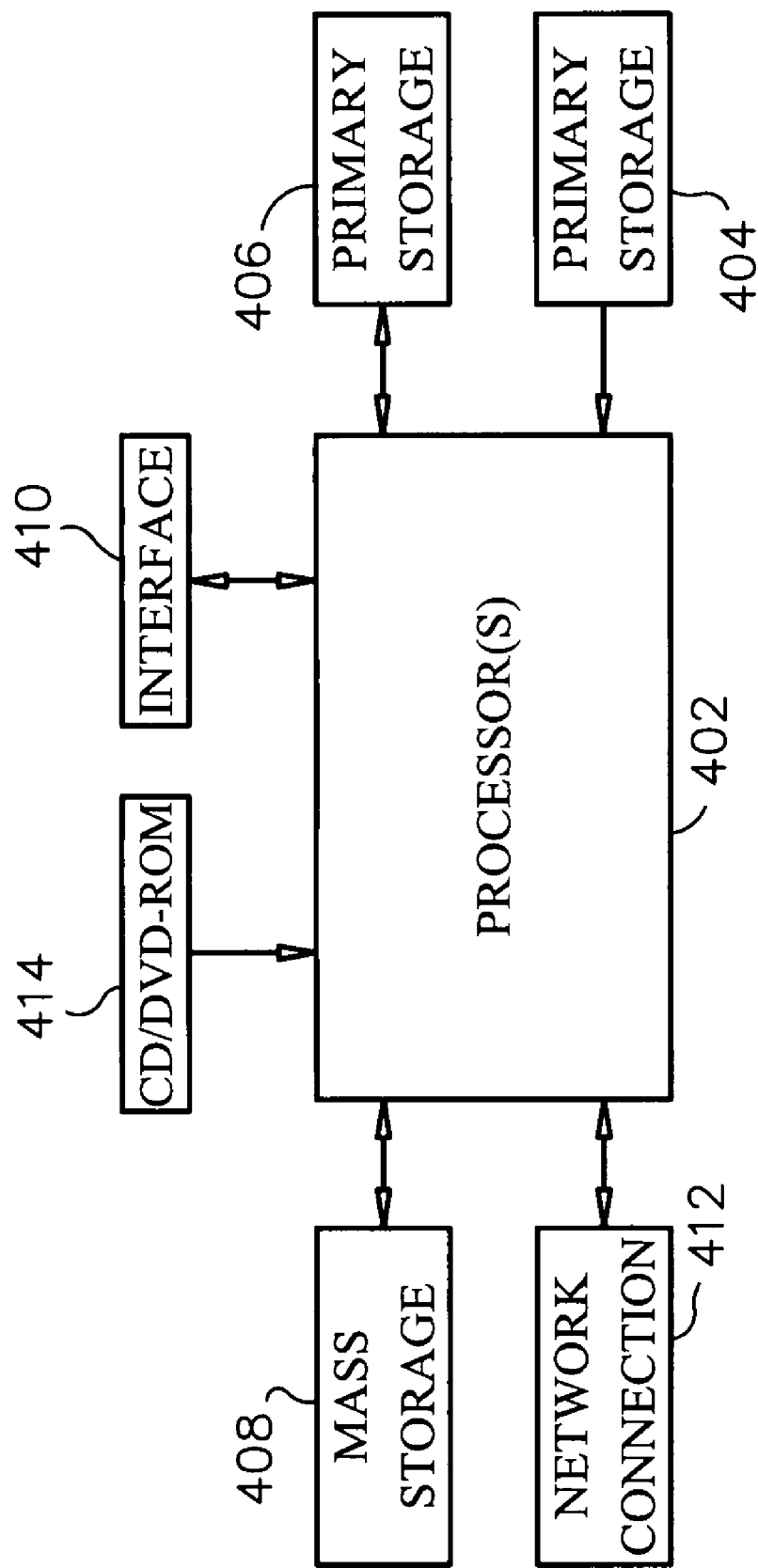
FIG. 4 illustrates various typical computer hardware components that may be included in a system 100, 100' or a system under test as described herein.

FIG. 4 illustrates various typical computer hardware components that may be included in a system 100, 100' or a system under test 10 as described herein. For example, any of these systems may include any number of processors 402 (also referred to as central processing units, or CPUs), which, for example may be included in data reduction engine 102, in running any of the software of system 10, as well as comparator engine 106 and reporting engine 108. CPU(s) may be coupled to storage devices including primary storage 406 (typically a random access memory, or RAM), primary storage 404 (typically a read only memory, or ROM). As is well known in the art, primary storage 404 acts to transfer data and instructions uni-directionally to the CPU and primary storage 406 is used typically to transfer data and instructions in a bi-directional manner Both of these primary storage devices may include any suitable computer-readable media such as those described below. A mass storage device 408 may also be coupled bi-directionally to CPU(s) 402 and provides additional data storage capacity and may include any of the computer-readable media described below. Mass storage device 408 may be used to store programs, data and the like and is typically a secondary storage medium such as a hard disk that is slower than primary storage. It will be appreciated that the information retained within the mass storage device 408, may, in appropriate cases, be incorporated in standard fashion as part of primary storage 406 as virtual memory. A specific mass storage device such as a CD-ROM or DVD-ROM 414 may also pass data uni-directionally to the CPU.

CPU(s) 402 may also be coupled to an interface 410 that includes one or more input/output devices such as such as video monitors (on which inputs and/or outputs may be displayed), track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to a computer or telecommunications network using a network connection as shown generally at 412. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for data reduction, data comparison and/or output reporting formats may be stored on mass storage device 408 or 414 and executed on CPU 402 in conjunction with primary memory 406.

In addition, embodiments of the present invention further relate to computer readable media or computer program products that include program instructions and/or data (including data structures) for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM, CDRW, DVD-ROM, or DVD-RW disks; magneto-optical media such as floptical disks; and hardware devices that are specially configured to store and perform program instructions, such as read-only memory devices (ROM) and random access memory (RAM). Computer readable media are not intended to include carrier waves. Examples of program instructions include both machine code, such as produced by a compiler, and files containing higher level code that may be executed by the computer using an interpreter.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of testing operation of an instrument controlled by a system under test, said method comprising:
    inputting raw data to an independent data reduction engine configured to calculate independent reduced data, wherein the raw data is the same as raw data inputted to the system under test to calculate reduced data, and wherein the system under test is configured for controlling an instrument;
    calculating independent reduced data using at least one independent algorithm that is independent of a corresponding algorithm used by the system under test to calculate the reduced data;
    calculating independent further reduced data or metadata from said independent reduced data using at least one independent algorithm that is independent of a corresponding algorithm used by the system under test to calculate further reduced data or metadata;
    comparing values of the further reduced data or metadata with corresponding values of the independent further reduced data or metadata; and
    performing at least one of outputting a result of said comparing for use by a human user, and storing a result of said comparing in memory.

2. The method of claim 1, further comprising qualifying at least one of the value comparisons as pass or fail, depending upon whether a difference between the reduced data value and the independent reduced data value of the value comparison is within a predetermined threshold range.

3. The method of claim 1, further comprising outputting an overall determination of whether the system under test passes qualification.

4. The method of claim 1, wherein the instrument is an analytical instrument.

5. The method of claim 1, wherein the reduced data comprises intermediate metadata subsequently used by the system under test to calculate final metadata.

6. The method of claim 1, wherein the system under test comprises a computerized data system.

7. The method of claim 1, wherein said calculating independent reduced data comprises one or more calculations performed according to instructions instantiated as forms.

8. The method of claim 1, wherein the system under test produces reported data from at least the reduced data, said method further comprising:
    calculating independent reported data from at least said independent reduced data;
    comparing values of the reported data with corresponding values of the independent reported data; and
    performing at least one of outputting a result of said comparing for use by a human user, and storing a result of said comparing in memory.

9. The method of claim 8, further comprising performing final evaluation of the system for acceptance to generate a final acceptance or failure result from further procession of results of said comparisons.

10. The method of claim 1, wherein the system under test produces reported data from the reduced data and the further reduced data or metadata, said method further comprising:
    calculating independent reported data from said independent reduced data and said independent further reduced data or metadata;
    comparing values of the reported data with corresponding values of the independent reported data; and
    performing at least one of outputting a result of said comparing for use by a human user, and storing a result of said comparing in memory.

11. The method of claim 10, further comprising performing final evaluation of the system for acceptance to generate a final acceptance or failure result from further procession of results of said comparisons.

12. The method of claim 1, further comprising performing final evaluation of the system for acceptance to generate a final acceptance or failure result from further procession of results of said comparisons.

13. A method comprising forwarding a result obtained from said comparing step of claim 1 to a remote location.

14. A method comprising transmitting data representing a result obtained from said comparing step of claim 1 to a remote location.

15. A method comprising receiving a result obtained from said comparing step of claim 1 from a remote location.

16. A system for testing operation of an instrument controlled by a system under test, by testing data calculated by said system under test said system for testing comprising:
    a data reduction engine operating independently of the system under test, said data reduction engine being configured to receive raw data, wherein the raw data is the same as raw data inputted to the system under test to calculate reduced data; and
    at least one independent algorithm provided in said data reduction engine for calculating independent reduced data, said at least one independent algorithm being independent of a corresponding algorithm used by the system under test to calculate the reduced data, and at least one independent algorithm for calculating independent further reduced data from the independent reduced data, said at least one independent algorithm being independent of a corresponding algorithm used by the system under test to calculate further reduced data from the reduced data a comparator engine configured to compare values of the further reduced data or metadata with corresponding values of the independent further reduced data or metadata.

17. The system of claim 16, further comprising a further comparator engine; said further comparator engine configured to receive the reduced data calculated by the system under test and independent reduced data calculated by said data reduction engine, and to compare corresponding data values of the reduced data and the independent reduced data.

18. The system of claim 17, wherein said further comparator engine is further configured to qualify at least one of the value comparisons as pass or fail, depending upon whether a difference between the reduced data value and the independent reduced data value of the value comparison is within a predetermined threshold range.

19. The system of claim 18 configured with at least one settable threshold Range, wherein at least one of said at least one settable threshold range is settable by a human user.

20. The system of claim 18, further comprising at least one form, wherein said comparator engine qualifies said comparisons according to instructions instantiated as forms.

21. The system of claim method of claim 17, further comprising a calculation engine configured to provide an overall determination of whether the system under test passes qualification.

22. The system of claim 17, further comprising a reporting engine configured to receive at least one of independent reduced data and independent further reduced data or metadata and output reported data.

23. The system of claim 22, further comprising at least one form, wherein said reporting engine generates and outputs an output report according to instructions instantiated as forms.

24. The system of claim 17, further comprising at least one form, wherein said comparator engine compares said corresponding data values according to instructions instantiated as forms.

25. The system of claim 16, wherein the instrument is an analytical instrument.

26. The system of claim 16, wherein the reduced data comprises intermediate metadata subsequently used by the system under test to calculate further reduced data or metadata.

27. The system of claim 26, wherein the further reduced data is used to produce reported data.

28. The system of claim 16, wherein the system under test comprises a computerized data system.

29. The system of claim 16, further comprising at least one form, wherein said data reduction engine calculates said independent reduced data according to instructions instantiated as forms.

30. A computer readable medium carrying one or more sequences of instructions for testing operation of an instrument controlled by a system under test, wherein execution of one or more sequences of instructions by one or more processors causes the one or more processors to perform a method comprising:

inputting raw data to an independent data reduction engine configured to calculate independent reduced data for comparison to reduced data calculated by the system under test, wherein the system under test is configured for controlling an instrument, and wherein the raw data is the same as raw data inputted to the system under test to calculate the reduced data;

calculating independent reduced data using at least one independent algorithm that is independent of a corresponding algorithm used by the system under test to calculate the reduced data;

calculating independent further reduced data or metadata from said independent reduced data using at least one independent algorithm that is independent of a corresponding algorithm used by the system under test to calculate the further reduced data or metadata;

comparing values of the further reduced data or metadata with corresponding values of the independent further reduced data or metadata; and performing at least one of outputting a result of said comparing for use by a human user, and storing a result of said comparing in memory.

* * * * *

UNITED STATES PATENT AND TRADEMARK OFFICE
CERTIFICATE OF CORRECTION

| | | |
|---|---|---|
| PATENT NO. | : 7,668,680 B2 | Page 1 of 1 |
| APPLICATION NO. | : 11/713394 | |
| DATED | : February 23, 2010 | |
| INVENTOR(S) | : Charles Manfredi | |

It is certified that error appears in the above-identified patent and that said Letters Patent is hereby corrected as shown below:

On the Title Page, Item (56) under "Other Publications", line 3, delete "Empower TM" and insert -- Empower™ --, therefor.

On the Title Page, Item (57) under "Abstract", line 1, delete "Methods" and insert -- Methods, --, therefor.

In column 15, line 26, in claim 19, delete "Range," and insert -- range, --, therefor.

In column 15, line 31, in claim 21, delete "The system of claim method of claim" and insert -- The system of claim --, therefor.

Signed and Sealed this

Eleventh Day of May, 2010

David J. Kappos
*Director of the United States Patent and Trademark Office*